Patented Mar. 12, 1929.

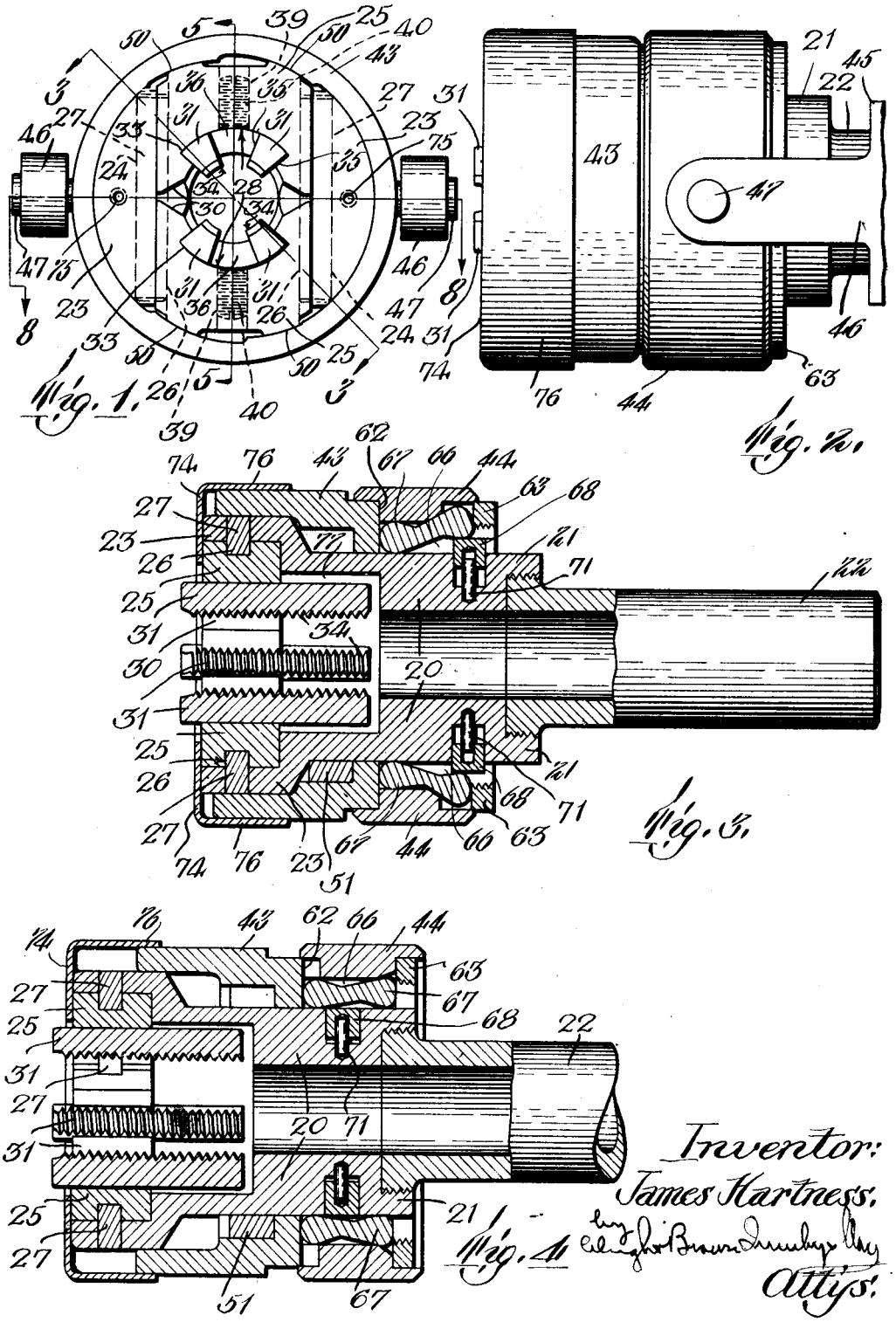

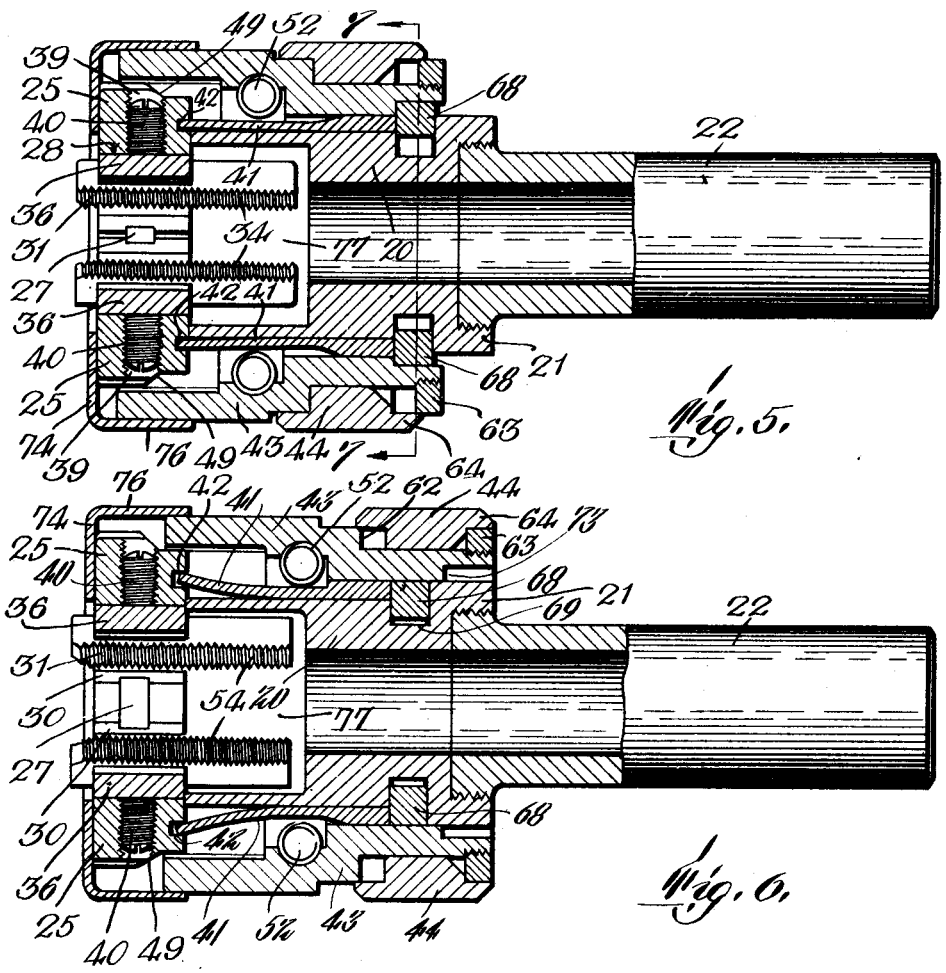
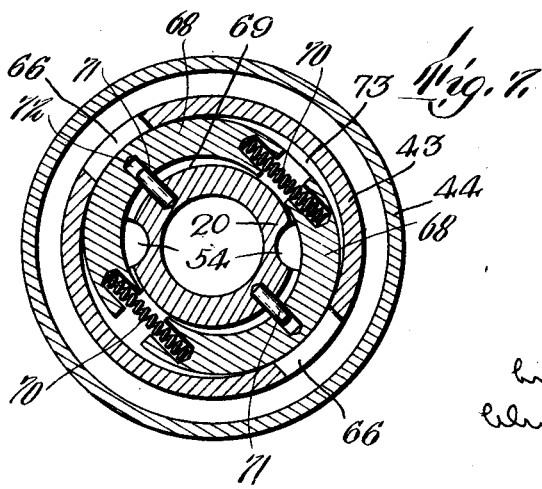

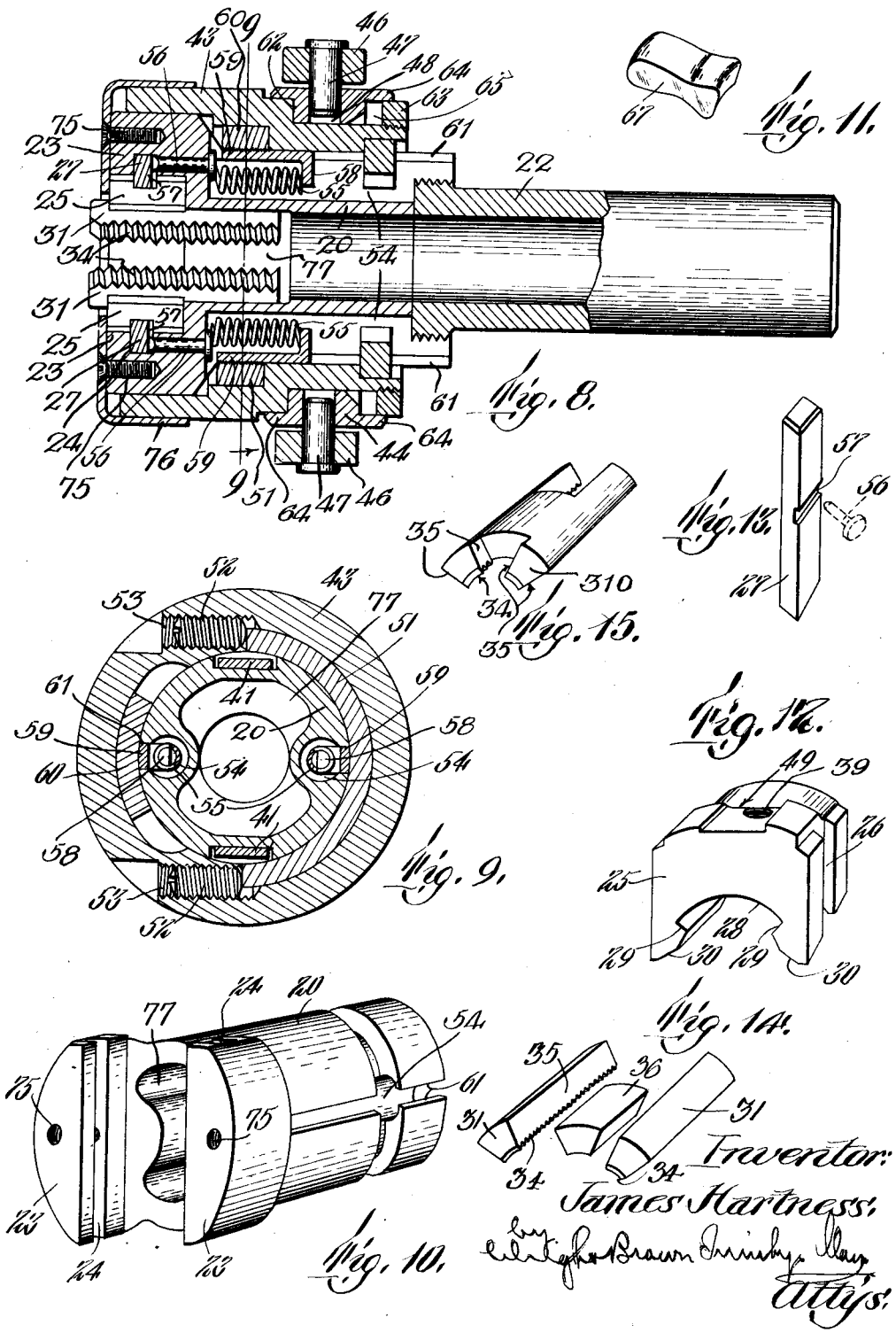

1,704,741

UNITED STATES PATENT OFFICE.

JAMES HARTNESS, OF SPRINGFIELD, VERMONT.

AUTOMATIC DIE.

Application filed January 19, 1924. Serial No. 687,376.

This invention has for its object to produce a die of the ordinary type, which may be automatically opened and closed, which is compact in construction and accurate in operation, and which will possess certain other features of advantage to which reference will subsequently be made.

Referring to the drawings,—

Figure 1 represents in end elevation a die embodying the invention.

Figure 2 represents a side elevation of the same.

Figure 3 represents a longitudinal section on the line 3—3 of Figure 1 with the chasers in operative cutting position.

Figure 4 represents a section like that in Figure 3 but with the chasers in inactive position.

Figure 5 represents a section on the line 5—5 of Figure 1 with the chasers in an active or cutting position.

Figure 6 represents a similar section with the chasers in an inactive or non-cutting position.

Figure 7 represents a section on the line 7—7 of Figure 5.

Figure 8 represents a longitudinal section on the line 8—8 of Figure 1.

Figure 9 represents a section on the line 9—9 of Figure 8.

Figure 10 represents the body of the die.

Figure 11 represents one of the locking dogs whose purpose is ultimately to hold the chasers either in an active or an inactive position.

Figure 12 represents one of the chaser carriers.

Figure 13 represents one of the removable guide bars for the chaser carriers.

Figure 14 illustrates in perspective a set of chasers and wedge block to be fitted into a chaser carrier.

Figure 15 illustrates another form of chaser which may be employed.

Before proceeding to describe the die which is illustrated by the figures of the drawings thus briefly referred to, I desire to have it understood that this instrumentality is but one embodiment of the invention, which however is capable of various other embodiments without departing from the spirit and scope of the appended claims.

Proceeding now to a detailed description of the particular die which is illustrated on the drawings,—20 indicates what may be termed for convenience the body of the die. This body is hollow and is generally of the shape shown in Figure 10. At its rear end it is provided with an internally threaded flange 21, into which is screwed a tubular bar 22 which serves as a supporting member for the die and by which the die may be mounted in any convenient holder. At its front end the body 20 is provided with two segmental members 23, 23 having inner parallel faces which are grooved at 24. These segmental members form guideways for the chaser carriers of which there are two in number as indicated at 25. The outer faces of the members are arcuate and are concentric with the axis of the body. The two chaser carriers 25, of which one is shown in Figure 12, are placed between the opposing faces of the segments 23 and are movable toward and from each other. Each of these carriers is in the form of a block having grooves 26 in its side faces. A guide bar 27 is introduced into each of the grooves 24 in the segments 23 and enters a complemental groove 26 in each of the two carriers 25, so as to accurately guide the carriers in their movement toward and from each other and prevent any loose movement. The faces of the carriers engage the inner faces of the segments, the guide bars 27 serving to hold carriers against movement axially of the body. Each carrier is provided with a sector-shaped recess formed by an arcuate inner face 28 and two radial faces 29, 29, the recess being further formed by the flaring walls or faces 30. These recesses are so formed as to receive chasers of which a plurality may be provided. In the particular die which I have selected for illustration and description, there are four of these chasers as indicated at 31, two chasers being secured to each of the carriers. Each chaser consists of an elongated bar having a convexly curved outer or top face 33 and a concave toothed inner or bottom face 34. The sides of each chaser converge from the outer face to the inner face as indicated at 35, 35. In end view each chaser presents somewhat the appearance of a keystone. The chasers are so formed as to be introduced into the segmental or sector-shaped recess of one of the carriers, their outer faces 33 conforming to the curvatures of the faces 28 and their farthest sides being radial and thus adapted to bear against the radial faces or walls 29 of the carrier. To hold each pair of chasers in the carrier a wedge-shaped block 36 is employed, this block being concavo-convex and having sides to engage the confronting faces 35 of the chasers. Two chasers and the wedge block 36 may be assembled and introduced longitudinally into the sector-shaped recess in the carrier, and the chasers may then be locked in place by driving the wedge firmly between the associated chasers.

For this purpose each carrier is provided with a threaded aperture 39 into which is introduced a screw 40, as shown in Figures 5 and 6, the screw in each case being of insufficient length to project beyond the carrier when it is driven home. The two carriers are arranged between the segments 23 of the body so that the chasers will project forwardly and rearwardly beyond the carriers as shown in Figures 3, 4, 5 and 8. The carriers are held normally in an outer inactive position by stout leaf-springs 41, 41, whose free ends are engaged within sockets 42 in the inner sides of the chaser carriers and whose rearward fixed ends are held in dove-tailed grooves formed in the periphery of the body 20 or otherwise secured to said body. The chaser carriers are thrust toward each other by a slidable sleeve indicated at 43. This sleeve fits upon the cylindrical rear portion of the body and may be moved axially of the body by a collar indicated at 44 in a manner which will be subsequently explained. The collar 44 may itself be moved or held against movement by a yoke comprising a hub or collar 45 slidable on the supporting member 22 of the die and having arms 46 with pins 47 entering apertures 48 in the collar 44. The front end of the sleeve 43 is enlarged so as to overlap the outer ends of the chaser carriers 25, the latter being provided with cams 49, so that, when the sleeve is advanced, its inner face will ride up over the cams and thus force the chaser carriers towards each other against the tension of the springs 41. Similarly when the sleeve is moved rearwardly, the end of the sleeve rides down the cams 49 and the springs 41 move the chaser carriers and the chasers to inactive or open position. It is desirable, however, that in addition to the relative sliding movement of the sleeve and the body, means should be provided for effecting a relatively fine adjustment of the chasers and their carriers toward and from each other. To this end the sleeve 43 is capable of rotative adjustment and it is provided with inner eccentric or cam faces 50, 50 for engaging faces on the cam members 49 of the carriers as shown in Figure 1, so that, by rotating the sleeve slightly anticlockwise in Figure 1, the chaser carriers may be adjusted toward each other, and, by rotating the sleeve clockwise, the chaser carriers will under the impulsion of the springs 41 separate slightly. I provide means for effecting the rotative adjustment of the sleeve 43 about the body which may take the form of a ring section 51, which is slidingly secured to the exterior of the body by means to be explained and is overlapped by or housed within the sleeve 43. This ring section, as shown in Figure 9, is substantially semi-circular, and against its ends abut two adjusting screws 52, 52, which are arranged in parallelism and which are screwed into threaded sockets 53 formed in the sleeve. Inasmuch as the ring section 51 is adjustably secured to the body, it is quite evident that an appropriate and relative adjustment of the two screws 52, 52 will result in a limited rotative movement of the sleeve relatively to the body.

The sleeve is normally under spring pressure tending to thrust the sleeve rearwardly relatively to the body or to thrust the body forwardly relatively to the sleeve. To accomplish this result, as well as to hold the ring segment 51 rigidly to the body, the said body is provided with parallel longitudinal diametrically-opposite grooves or recesses 54 in which are located springs 55, as shown in Figures 8 and 9. The forward ends of these springs which are helical in form bear against the heads of pins 56, 56. The ends of the shanks of the pins engage transverse grooves 57 in the guide bars 27 so as to hold said guide bars against dislocation. The other ends of the springs bear against lugs or ears 58 formed on the bars or members 59. One of these bars or members is rigidly secured, by spot-welding for example, to the ring section 51, whereas the other is similarly secured to a short ring section 60 as shown in Figure 9. These bars are arranged in slots or guideways 61 which communicate with the recesses 54. By reason of this construction and arrangement, it will be observed that, since the sleeve 43 is connected rigidly but adjustably to the ring section 51 and since the bar 59 which is rigidly secured to the ring section 51 is located in the guideway 61, means are thus provided by which the sleeve is guided in its longitudinal movement relatively to the body and is held against loose rotative movement. Furthermore, since the springs 55 are interposed between the lugs 58 and the head end of the body, the pressure of the springs tends to move the sleeve rearwardly or to the right in Figure 8. The two ring sections 51 and 60, together with the bars 59 to which they are secured, act as guide members in connection with the grooves in the sides of the body for guiding the relative sliding movement of the sleeve 41 and the body.

I will now explain how the operating sleeve 43 and the body are locked in either of two positions, that is, either in a position in which the chasers are closed upon the work or in a position in which they are opened and inactive. The collar 44, which I have previously referred to as utilized in effecting a relative movement of the operating sleeve and the body of the die, has a limited sliding movement longitudinally of the body, being arranged on the sleeve in a peripheral groove which is greater in width than the collar. This groove is formed by a shoulder 62 on the exterior of the sleeve and by a flange 63 which takes the form of an annular member threaded on the end of the sleeve. Preferably the collar has lateral flanges 64, 64 which overlap the shoulder 62 and the annular member 63 so as to prevent the access of dirt into the groove which may be indicated as a whole at 65. By reason of this construction, it is evident that the operating collar 44 is capable of a limited sliding movement relatively to the body and sleeve. The end of the sleeve 43 is provided with two diametrically-opposite slots or recesses indicated at 66 in which are located two locking dogs 67, as shown in Figures 3 and 4, one of these dogs being shown detached in Figure 11. The dogs are thus located between the operating collar 44 and the body 20, and are held against lateral dislocation by the side walls of the groove 66. One end of each dog bears against the operating sleeve 43 at the end of the recess formed therein and the other end of the dog bears against the flange or annular member 63 formed on or secured to the sleeve or against the opposite end wall of the groove 66, but each dog is capable of movement in its groove from the position shown in Figure 4 to the position shown in Figure 3 and vice versa. The sleeve 43 is positively locked in position to maintain the chasers in their closed position by two locking members 68 which may conveniently take the form of two ring segments as shown in Figure 7. These segments are arranged in a peripheral groove 69 in the body and they are normally pressed apart by springs 70, being guided in their movement by pins 71 projecting radially from the bottom of the groove and entering sockets 72 in the ring segments. The sleeve 43 has an internal shoulder 73 (see Figures 5 and 6) with which the ring segments may engage when the operating sleeve 43 has been advanced to its extreme forward position so as to lock the sleeve against recessional movement as shown in Figure 5. The rear ends of the two dogs 67 overlap the two ring segments or locking members 68, so that, by moving the collar 44 from the position shown in Figure 3 to the right, the rear ends of the dogs will be wedged and rocked downwardly so as to depress the locking members 68 to a position where their outer or peripheral surfaces are flush with the peripheral surface of the body 20 and thus disengage the locking members from the operating sleeve, as a result of which the sleeve may be moved backwardly to the position shown in Figure 4. The collar 44 and the two dogs 67 are provided with cam or wedging faces by which the movement of the collar effects the operation of the dogs.

Assuming that the operating sleeve is locked in its chaser-closing position as shown in Figure 3, that the chasers are in engagement with the work, and that either the work or the die is being rotated so as to effect a longitudinal movement of the die relatively to the work, when the die has advanced along the work to the desired extent, the movement of the yoke is arrested by any conveniently placed stop member, as a result of which the collar is held against further advancing movement. The die continues, however, to advance relatively to the collar so that the dogs 67, in passing under the collar, are wedged downwardly so as to compress the locking members within the grooves. As soon as the operating sleeve is released by the locking member 68, the compression springs 55 slide the operating sleeve rearwardly, thereby permitting the chaser-moving springs 41 to move the chaser carriers radially outwardly and disengage the chasers from the work, whereupon the advancing movement of the die ceases, this movement having been caused by the engagement of the chasers with the work and by the relative rotation of the work and the die. The die may now be bodily withdrawn until the yoke engages another suitably spaced stop, whereupon the collar 44 is arrested in its recessional movement, and the continued movement of the operating sleeve 43 and the dogs 67 permits the dogs to rock outwardly to the position shown in Figure 3, thereby releasing the locking member 68, so that when the sleeve is arrested the continued movement of the die body permits finally the locking member 68 to spring outwardly and engage the shoulders on the sleeve. During the recessional movement of the die body, while the sleeve and the collar are held against movement, the operating outer end of the sleeve wedges the chaser carriers radially inwardly until the chasers have reached a closed position, whereupon the sleeve and the die body are locked together by the locking members. The springs 55 hold the operating sleeve firmly against the locking members or ring sections 68 as soon as the latter are forced outwardly by the springs 70.

In order to prevent access of chips, cuttings and dirt into the die body, a cap member 74 is secured to the end of the die body by screws passed into threaded apertures 75 in the front faces of the segments 23. This cap has a flange 76 which overlaps and is in sliding engagement with the end of the operating sleeve 43.

In the construction as herein described, it will be observed that each chaser carrier is provided with a plurality of chasers, and that these chasers together with their locking member are arranged somewhat as are the stones of an arch, the locking member constituting as it were the keystone of the arch and serving to wedge the chasers firmly in position. Each chaser, however, is capable of independent longitudinal adjustment so that it may be accurately located with reference to the other chasers. I would not consider it a departure from the invention, however, if each pair of chasers and their locking member were formed in a single element 310 as shown in Figure 15. The die body is hollow as previously explained, having a relatively large central pocket or recess 77, into which the rear ends of the chasers project and which is of sufficient dimensions to permit the necessary movements and adjustments of the chasers. The chasers themselves project both forwardly and rearwardly from the chaser carriers. By reason of the construction and arrangement of the various parts of a die as herein described, the die as a whole is exceedingly compact and the supporting walls of the structure are brought as close to the work as possible. The chasers as they become worn may be ground back with ease, and, as previously stated, the facility with which the individual chasers may be adjusted enables the chasers to be accurately located after grinding. While as I have already said I would not regard it as a departure from the spirit and scope of the invention if each pair of chasers and its wedge member were formed in one integral part, yet I prefer to make these in three pieces as I am thereby enabled to produce a high grade chaser in which all of the surfaces, including the threaded surfaces, may be ground after hardening. It may further be pointed out that, as a result of the compact construction and arrangement of the parts, it is possible to permit the front ends of the chasers to project forwardly from the supporting and operating structures, as shown for example in Figure 3. While I have described each chaser carrier as being provided with only two chasers, it is evident that this number of chasers may be increased if desired.

I have herein referred to the dogs 67 as being "locking dogs". In addition to their function of pressing the locking members or ring sections 68 into their inactive positions, these dogs also perform the function of holding the operating collar 44 yieldingly in either of its two positions relatively to the operating sleeve. For example, when the dogs are in the position as shown in Figure 3, they yieldingly lock the collar 44 to the sleeve by reason of the engagement of the cam or wedging faces of the dogs and the collar, the dogs themselves being held in the position shown by the outward thrust of the locking members 68 due to their separation under the impulse of the springs 70. Again when the collar and the sleeve are in the relative position shown in Figure 4, the outward pressure of the locking members 68 against the dogs causes the dogs to bear against the collar 44 with sufficient pressure to yieldingly lock it in the position shown in this figure.

Considering the structure of the entire die body, the sleeve slides in longitudinal guideways on the die body but is capable of controlled rotative adjustment to adjust the chaser carriers; and the chaser carriers move in guideways on the body in lines radial thereto.

Having thus explained the nature of my said invention and described a way of making and using the same, although without attempting to set forth all of the forms in which it may be made or all of the modes of its use, what I claim is:—

1. A thread-cutting die comprising a hollow tubular body having radial guideways and a longitudinal guideway, chasers, chaser carriers movable in said radial guideways, an operating sleeve longitudinally movable on said body and adapted to close said chaser carrier, said carriers and sleeve having coacting cam faces whereby the partial rotation of said sleeve effects a radial adjustment of said carriers, a ring section located between said sleeve and said body and movable in said longitudinal guideway, and adjusting screws in said sleeve engaging oppositely disposed faces on said section for adjustably attaching said sleeve to said section, whereby said sleeve is guided in its longitudinal movement.

2. A thread-cutting die comprising a hollow body, radially movable carriers supported by said body, chasers on said carriers, an operating sleeve longitudinally slidable on said body, ring sections located between said sleeve and said body and attached to said sleeve, said body having longitudinally extending slots, springs located in said slots and bearing at one end against said body, and ears or lugs projecting from said sections into said slots and engaging the other ends of said springs, whereby said springs tend to move said sleeve longitudinally of said body.

3. A thread-cutting die comprising a hollow body circular in cross section and having longitudinal guideways and also having radial guideways at one end, chaser carriers movable in said radial guideways toward and from the axis of said body, a sleeve movable longitudinally on said body to actuate said carriers to closed position and held against rotation by said longitudinal guideways, springs encased in said body for moving the sleeve in one direction, locking mechanism carried by the body for holding the sleeve against said movement, and means on said sleeve automatically controlling said locking mechanism to lock or unlock said sleeve.

4. A thread-cutting die comprising a hollow body circular in cross section and having longitudinal guideways and also having radial guideways at one end, chaser carriers movable in said radial guideways toward and from the axis of said body, a sleeve movable longitudinally on said body to actuate said carriers to closed position and held against rotation by said longitudinal guideways, springs encased in said body for moving the sleeve in one direction, locking mechanism carried by the body for holding the sleeve against said movement, means for disengaging said locking mechanism from said sleeve to permit said movement, and springs on said body and within said sleeve for moving said chaser carriers to open position when said sleeve is in an inactive position.

5. A revolving automatically-opening die, adapted to be fed along the work by engagement of the chasers with the work, comprising a body, radially movable chaser carriers, chasers on said carriers, springs tending to move said carriers to open position, a sliding sleeve on said body in wedging relation to said carriers, yielding means tending to move said sleeve to inactive position and permit the carriers to move to open position, locking mechanism for positively locking said sleeve to the body to hold it in active carrier-closing position, a collar slidable on said sleeve, and means by which movement of said sleeve relatively to said collar, when said collar is held against movement, controls the locking or unlocking operation of said locking mechanism.

In testimony whereof I have affixed my signature.

JAMES HARTNESS.